United States Patent
Roux et al.

(10) Patent No.: US 10,716,393 B2
(45) Date of Patent: Jul. 21, 2020

(54) GLASS-CERAMIC PLATE FOR A WORKTOP OR A PIECE OF FURNITURE

(71) Applicant: EUROKERA S.N.C., Chateau Thierry (FR)

(72) Inventors: Nicolas Roux, Chateau-Thierry (FR); Pablo Vilato, Paris (FR); Franck Demol, Reims (FR); Gregory Debreyer, Montcourt Fromonville (FR); Bertrand Charpentier, Chateau-Thierry (FR); Virginie Goldenberg, Aubervilliers (FR)

(73) Assignee: EUROKERA S.N.C., Chateau Thierry (FR)

( * ) Notice: Subject to any disclaimer, the term of this patent is extended or adjusted under 35 U.S.C. 154(b) by 0 days.

(21) Appl. No.: 16/095,972

(22) PCT Filed: Apr. 24, 2017

(86) PCT No.: PCT/FR2017/050962
§ 371 (c)(1),
(2) Date: Oct. 24, 2018

(87) PCT Pub. No.: WO2017/187069
PCT Pub. Date: Nov. 2, 2017

(65) Prior Publication Data
US 2019/0150607 A1    May 23, 2019

(30) Foreign Application Priority Data
Apr. 25, 2016 (FR) ...................... 16 53639

(51) Int. Cl.
*A47B 13/00*    (2006.01)
*F24C 7/06*    (2006.01)
(Continued)

(52) U.S. Cl.
CPC ............ *A47B 13/003* (2013.01); *A47B 13/12* (2013.01); *A47B 96/18* (2013.01); *F24C 7/067* (2013.01);
(Continued)

(58) Field of Classification Search
CPC ... A47B 3/06; A47B 2013/022; A47B 13/023; F16B 12/48; F16B 12/46
(Continued)

(56) References Cited

U.S. PATENT DOCUMENTS

| 3,978,633 A | 9/1976 | Scheidler et al. |
| 4,599,950 A * | 7/1986 | Evans ............... A47B 13/12 108/150 |

(Continued)

FOREIGN PATENT DOCUMENTS

| DE | 60 2004 001 087 T2 | 12/2006 |
| EP | 2 108 893 A2 | 10/2009 |

(Continued)

OTHER PUBLICATIONS

International Search Report dated Jul. 25, 2017 in PCT/FR2017/050962 filed Apr. 24, 2017.

*Primary Examiner* — Jose V Chen
(74) *Attorney, Agent, or Firm* — Oblon, McClelland, Maier & Neustadt, L.L.P.

(57) ABSTRACT

The present invention relates to a novel glass-ceramic sheet intended in particular to be used as a surface of a furniture unit and/or as a worktop, and which comprises, in at least one of its faces, in particular its lower face, at least one connection element of a height less than 10 cm and of which the cross section is inscribed inside a circle of a diameter less than 3 cm, said connection element being made from a material able to withstand at least 70° C. and being bonded to said face by means of a thermosetting adhesive.

(Continued)

The present invention also relates to an item of furniture and/or household equipment, and in particular a worktop or a furniture unit incorporating said sheet.

15 Claims, 3 Drawing Sheets

(51) Int. Cl.
| | |
|---|---|
| *F24C 7/08* | (2006.01) |
| *F24C 15/10* | (2006.01) |
| *A47B 96/18* | (2006.01) |
| *H05B 6/12* | (2006.01) |
| *A47B 13/12* | (2006.01) |
| *F21V 33/00* | (2006.01) |
| *F21W 131/301* | (2006.01) |

(52) U.S. Cl.
CPC ............ *F24C 7/083* (2013.01); *F24C 15/102* (2013.01); *H05B 6/1245* (2013.01); *A47B 2200/0001* (2013.01); *A47B 2200/0073* (2013.01); *F21V 33/0012* (2013.01); *F21W 2131/301* (2013.01); *H05B 2206/022* (2013.01); *Y02B 40/126* (2013.01)

(58) Field of Classification Search
USPC ................ 108/157.1, 156, 157.17; 248/188
See application file for complete search history.

(56) References Cited

U.S. PATENT DOCUMENTS

| | | | | |
|---|---|---|---|---|
| 6,016,756 A | * | 1/2000 | McMahon | A47B 13/021 |
| | | | | 108/156 |
| 6,032,589 A | * | 3/2000 | Wang | F16M 7/00 |
| | | | | 108/147.11 |
| 6,619,601 B1 | * | 9/2003 | Vall | A47B 13/02 |
| | | | | 108/158.12 |
| 6,752,142 B2 | * | 6/2004 | Kollner | F24C 15/14 |
| | | | | 108/156 |
| 6,776,106 B2 | * | 8/2004 | Lin | A47B 13/021 |
| | | | | 108/156 |
| 7,611,106 B2 | * | 11/2009 | Kondo | G05G 1/60 |
| | | | | 248/188 |
| 2003/0160139 A1 | * | 8/2003 | Camarota | A47B 13/021 |
| | | | | 248/188 |
| 2004/0245239 A1 | | 12/2004 | McWilliams | |
| 2014/0054253 A1 | * | 2/2014 | Reed | A47F 5/16 |
| | | | | 211/186 |
| 2018/0283422 A1 | * | 10/2018 | Kvist | F16B 5/0088 |
| 2018/0344027 A1 | * | 12/2018 | Hall | F16B 12/08 |

FOREIGN PATENT DOCUMENTS

| | | |
|---|---|---|
| ES | 2 531 302 | 3/2015 |
| FR | 2 258 353 | 8/1975 |
| WO | WO 2007/025823 A1 | 3/2007 |

* cited by examiner

Fig.4b ns as a hob, a glass-ceramic sheet generally needs to have
GLASS-CERAMIC PLATE FOR A WORKTOP OR A PIECE OF FURNITURE The present invention relates to a sheet (made) of glass-ceramic, particularly intended to serve as a worktop or a surface (in particular horizontal) of a furniture unit, this sheet in particular being of large dimensions, the invention also relating to the unit thus formed.

Glass-ceramic has been used in particular for several years to form vitreous ceramic hobs, which have been very successful with housekeeping experts, manufacturers of household electrical appliances and users alike, because of their attractive appearance and ease of cleaning.

Worktops themselves are generally made from other materials, for example wood, quartz, Corian®, etc., although the use of glass-ceramic sheets from which to make these worktops, although leading to problem sets specific to that material, is proving particularly attractive.

A glass-ceramic starts out as a glass, referred to as a precursor glass (or parent glass or green-glass), the specific chemical composition of which makes it possible, through suitable heat treatments referred to as ceramization, to bring about partially controlled crystallization. This partially crystallized specific structure gives the glass-ceramic unique properties.

Each glass-ceramic product is the result of specific studies and numerous tests, given that it is very tricky to make modifications to glass-ceramics and/or to the method by which they are obtained without risking an unfavorable effect on the sought-after properties: for example in its usual duty as a hob, a glass-ceramic sheet generally needs to have transmission in the visible domain that is both low enough to conceal the underlying heating elements at rest, and high enough that the user can visually detect when said elements are in operation, for safety purposes, and/or can read any displays there might be. Glass-ceramic sheets must also have sufficient mechanical strength as required for their use, and in particular and all the more so when they are large in size, and in particular, in the field of household electrical appliances, they must exhibit (as defined for example by standard EN 60335-2-6 for their usual duty as hobs) good ability to withstand pressure, impacts (for supporting, and tolerating the droppage of, utensils, etc.) etc.

In order to fulfill the function or functions assigned to them, glass-ceramic sheets are generally equipped with (decorative or functional) accessories or additional elements needed for their end-purpose (for example with heating elements or with a control strip in the case of hobs), particularly with electronic components, said elements or accessories generally being fixed to the sheet permanently, by being set into a housing provided in the sheet for that purpose and/or possibly by being bonded to a region distinct from the heating regions, where present. The position and choice of accessories are thus fixed in advance, and once the sheet and its accessories are assembled, if an element is defective, the assembly has to be dismantled using special-purpose tooling, or the repair entails exchanging the entire sheet or assembly.

Furthermore, for a sheet of large dimensions, the weight of the glass-ceramic is great and prevents said sheet from being handled easily in the event of problems; as a result, the use of glass-ceramic combined with electronic components from which to make worktops or surfaces of furniture units that are interactive and/or multifunctional presents problems in terms of the fitting or removal of the components, in particular when it is installations of a modifiable nature that are to be created.

The present invention has therefore sought to develop a sheet that allows simpler fitting and removal particularly of electronic equipment, suited to the intended uses of this sheet (in particular in a unit and/or as a worktop), particularly a sheet that allows various types of accessories to be fitted or removed at will without the use of special-purpose tooling and without changing the sheet, it also being possible for the choice of accessories to be made to order, or for accessories to be substituted for other accessories, as desired or as required, thus making it possible where appropriate to obtain an installation that can be modified.

This objective has been achieved by the novel glass-ceramic sheet according to the invention, which is intended in particular to be used as a surface of a furniture unit and/or as a worktop, and which comprises, in at least one of its faces (in particular and advantageously its lower (when in the position of use) face), at least one connection element (or connector) of a height (or thickness) less than 10 cm (preferably less than 6 cm, advantageously less than or equal to 4 cm) and of which the (external) cross section can be inscribed inside a circle of a diameter less than 3 cm (preferably less than 2 cm), said connection element being made from a material able to withstand at least 70° C. (and preferably able to resist at least 120° C.) and being bonded to said face by means of a thermosetting adhesive, said adhesive also advantageously having a coefficient of expansion (measured in accordance with standard ISO11359-2) of less than $900 \times 10^{-7}$ $K^{-1}$ between −40 and 80° C., and a shear strength (measured in accordance with standard ISO4587, on aluminum) greater than or equal to 10 N/mm².

The present invention also relates to an item of furniture and/or household equipment incorporating the sheet according to the invention, and in particular to a work table (or worktop) or a furniture unit, said item of equipment being formed by at least said sheet (in particular a sheet of large dimensions, particularly having a surface area greater than or equal to 0.7 m², as specified later) positioned (particularly horizontally) on one or more support elements (the carcass of a furniture unit, support leg(s)), so as to offer a stable surface. In particular, the present invention relates to a table or a furniture unit comprising a surface or plate, particularly of large dimensions, formed by the sheet according to the invention and able to allow simultaneous or successive performance of various activities and/or supporting of objects. This furniture unit may for example be a central island in a room, for example a kitchen island, or any worktable or worktop for various uses, for example a lab table, a table or a coffee table, or alternatively a unit of the side-table, credenza type, an item of storage furniture, a counter top, etc.

In particular, the invention relates to an item of furniture and/or household equipment in which the sheet occupies most (more than 50% of the surface of the face on which it is located, preferably more than 80%, in particular more 90%) and preferably all (thus forming a continuous surface) of one face of said item of furniture and/or household equipment, particularly the top (when in the position of use), in particular horizontal, face of said item of furniture and/or household equipment, so as to offer a continuous stable surface capable of allowing simultaneous or successive performance of activities (such as work, play, reading, etc.), supporting of objects (such as papers, computers, vases, crockery, etc.), and possibly the preparation or cooking or heating of food in suitable vessels, and/or any other use connected with the purpose for which the unit is intended. The sheet used is particularly and advantageously monolithic and has a thickness less than 15 mm, and a coefficient of expansion less than $30\times10^{-7}$ K$^{-1}$ between 20 and 400° C., and a surface area greater than or equal to 0.7 m$^2$, for use as a worktop or large surface of a furniture unit, as detailed later.

As indicated according to the invention, the glass-ceramic sheet developed comprises at least one, and preferably several, connection element(s) bonded to at least one of its faces (preferably essentially or even only on the lower face (or face that is not visible in the position of use) of the sheet). Each connection element (capable of making the connection with an attached element (which means to say with an element manufactured separately and then assembled), particularly additional element, as explained later) may be made in one or more parts (these parts then being connected and/or assembled to form said element), at least one or more (and advantageously all) of these connection elements with which the sheet is equipped preferably having the external appearance of cylindrical stud(s) or pin(s), where appropriate comprising one or more hollowed parts and/or where appropriate equipped with one or more other external or internal constituent components as explained and illustrated later.

The connection element(s) are advantageously formed, in particular when the sheet is intended to be equipped with heating, particularly inductive heating, elements on at least part (preferably at least half, or all) of their exterior surface, of refractory and/or non-magnetic material(s) able to withstand at least 70° C. and preferably at least 120° C., for example are formed of an external shell (or envelope) (particularly in the form of an at least partially hollow cylindrical stud or pin) made of aluminum or of graphite or of silicon carbide or of vermiculite or refractory fibers, etc.

Advantageously, the sheet comprises several connection elements as defined hereinabove, in particular positioned (more or less uniformly according to need) under the underside of the sheet, particularly distributed across the entirety of the lower face of the sheet.

The thermosetting adhesive used for bonding the connection element(s) allows the connectors to be fixed durably while offering a firm bond that offers better resistance to various stress loadings. For preference, the adhesive has an expansion coefficient comprised between 500 and $900\times10^{-7}$ K$^{-1}$ between −40 and 80° C. and a shear strength greater than or equal to 10 N/mm$^2$, in particular of the order of 10 to 50 N/mm$^2$, in particular of the order of 17 to 50 N/mm$^2$. This adhesive is preferably an adhesive of the epoxy or cyanoacrylate type. Recourse to these particular adhesives in order to secure connection elements which themselves allow the desired equipment or accessories to be attached has proved particularly appropriate and effective, even in any heating regions there might be, while at the same time being simple to implement and economical.

As mentioned previously, the connection element(s) are able to provide connection with an attached element, particularly additional element, whether this is directly an item of equipment or an accessory that is to be fitted or a receptacle capable of accepting various types of equipment or accessory. The small dimensions of the connection elements according to the invention both make it possible for said elements to be positioned at various points on the sheet without presenting problems of space and in order to offer a modifiable structure, and also make it possible for the attached elements to be positioned near the sheet so that they can perform their function while at the same time limiting the risk of damage (scratching of the sheet as a result of potential manipulation of these elements or possible exposure to heat of electronic components, etc.). For preference, the connection element(s) have a height less than 6 cm, advantageously less than or equal to 4 cm, and of at least 5 mm, and their external cross section can be inscribed inside a circle of a diameter less than 2 cm.

More particularly, at least part (or even all) of the connection elements are able to accept, advantageously removably, at least part of a support(ing) element (such as a casing or plate) that is to accept one or more accessories to be associated or, where appropriate, are able to accept at least part of an accessory that is to be associated directly. Where appropriate, the connection elements may also be associated in pairs or in groups, as illustrated later, some of these elements (or first elements) being intended to each accept at least a first part of the attached element(s) (supports and/or accessories) (and having a form or structure suited to accepting this part), and other elements (second elements) being intended to each accept at least a second part—different from the first part—of the attached element(s) (and having a form or structure, if appropriate different from that of the first connection elements, suitable for accepting this part), the connection elements associated in groups comprising where appropriate and according to the same principle, third elements, or even fourth elements, etc., according to the envisaged mode of assembly of the elements that are to be added.

In particular, at least one connection element, or several connection elements (or even all the connection elements where appropriate), comprises (or respectively each comprise) at least one fixing system for fixing (an) element(s) to be added, and the element or elements to be added (which are formed separately and assembled with the sheet by means of the connectors) are also each provided with at least one fixing (or coupling or attachment) means (or member or component or part) that complements said fixing system belonging to the aforementioned connection element(s). The connection element(s) thus provided is(are) each able to accept, advantageously removably, at least the complementary fixing means of an element that is to be added (or coupled). The element that is to be added, provided with a complementary fixing means, is preferably a support element (such as a casing or plate) that is to accept one or more accessories that are to be associated, thus allowing various types of accessories, particularly commonplace accessories or accessories that do not have any special structure for assembly, to be combined as required. Alternatively, the element that is to be attached, equipped with a complementary fixing means, may also directly be an accessory, in this case having or designed to have said complementary fixing means.

The accessories that are to be associated may for example be one or more heating elements (for example induction coils), display systems, electronic boards, light sources, control interfaces or housings, sensors, wireless chargers, etc. The support element or elements may in particular take the form of plate(s) or housing(s) or casing(s), for example made of aluminum or of plastic, intended to accept the accessories that are to be coupled to the sheet, it being possible for these plates or housings, as the case may be, to be completely separated from the sheet and its connectors, or to be detached from one or more connectors at least in one part, while at the same time remaining connected in another part to other connector(s) (when the connectors are associated in groups as mentioned hereinabove), for example using a rotary movement, the other connector(s) where applicable acting as pivots, as illustrated later, it being possible where appropriate for this (these) support element(s) to form part of the sheet and/or connector(s), or alternatively to be added if needed.

The fixing system provided on one or more connection elements may for example be formed of at least one cavity to accept the fixing means of the element that is to be added, combined with at least one immobilizing means (which may preferentially be removed or unlocked if need be) for immobilizing said fixing means once it is in place in the connector. The immobilizing means can in particular exert a force which is particularly oriented toward the glass-ceramic sheet, the direction in which the fixing means of the element that is to be added is introduced into the connection element preferentially being different from, particularly perpendicular to, the direction of said force exerted by the immobilizing means.

The immobilizing means may for example be formed by the combination of a pressing element such as a spring, on the outside of or inside the cylindrical shell that (in part) forms the connection element, with a stop element, such as a pin, keeping the spring in compression once the fixing means of the added element has been introduced into a cavity of the connection element, as illustrated later, the removal of the pin subsequently potentially allowing the added element to be extracted if need be.

The immobilizing means may also as an alternative be a magnet (the fixing means of the added element in that case being made from a suitable material such as a ferromagnetic material), or alternatively may be a part or a component of the connection element that is made from a material that can be attracted by a magnet, such as a ferromagnetic material, the fixing means of the added element then comprising a magnet or a magnetized part.

As previously indicated, the glass-ceramic sheet to which the connection element(s) are fixed is advantageously monolithic (or monoblock or made as a single piece), particularly essentially planar, and has a thickness less than 15 mm, particularly less than 12 mm, in particular less than or equal to 6 mm, and a coefficient of expansion less than $30 \times 10^{-7}$ $K^{-1}$ between 20 and 400° C. (and preferably less than $13 \times 10^{-7}$ $K^{-1}$ between 20 and 400° C.).

The presence of the connectors and accessories advantageously on the lower face makes it possible where appropriate to hide unattractive elements, to offer a visible surface with easy upkeep and to guarantee better durability of the accessories of the sheet etc. The glass-ceramic sheet thus offers a surface that is predominantly continuous/uniform/free of connections, attractive, and of easy upkeep. It may be provided with decorative or functional coatings of small thickness (in particular of the order of a few tens of nanometers to a few hundred microns, or even more), for example made of enamel, paint, thin layers, etc., and/or with other elements, which may or may not be attached to the aforementioned connectors.

Where appropriate, the sheet may have a surface area (which corresponds to the product of its length and its width) on its face of largest dimensions which is intended to be visible and act as a support for (household or work) items with dimensions greater than 0.4 $m^2$, in particular greater than 0.7 $m^2$, or even greater than 1 $m^2$, particularly greater than or equal to 2 $m^2$, for use as a worktop or a surface of a furniture unit. The sheet also preferably in this case has one and/or other of the following characteristics (the limits given being included): Young's modulus of between 80 and 100 GPa (measured according to the ASTM C 1259 standard), flexural strength of between 110 and 220 MPa (measured by a ring-on-tripod test, on a 70 mm×70 mm×4 mm sheet, the sample resting on three 9.5-mm diameter balls positioned at the vertex of an equilateral triangle inscribed in a 40-mm diameter circle, a force being applied to the center of the sample by a 10-mm diameter ring with an advance of 5 mm/min, the results being interpreted with the Weibull model described in: "A statistical distribution of strength of Materials", Royal Swedish Institute For Engineering Research, W. Weibull, Stockholm 1939, 1-45, the data obtained, also referred to as a "scale factor", revealing the average rupture stress and resulting from the analysis by the Weibull method of the flexural modulus of rupture (MOR) measurements, being expressed in MPa), thermal conductivity of less than 2 W/m·K (measured in particular according to the DIN 51936 standard), resistance to thermal shocks of between 250° C. and 700° C., density of between 2.3 and 2.7, resistance to acids of between 0 and 2 mg/$cm^2$ (measured according to the DIN12116 standard), and resistance to bases of between 0 and 1 mg/$cm^2$ (measured according to the ISO 695 standard).

The glass-ceramic sheet used is preferably flat (or predominantly or virtually flat) and in particular has a flatness (height between the highest point and the lowest point of the substrate, with respect to the mean plane of the substrate, excluding any possible deliberate deformations produced on the substrate for esthetic or functional purposes) of less than 0.1% of the diagonal of the substrate, and preferably of less than 3 mm, in particular of less than 2 mm and in particular of less than 1 mm, or even of about zero, depending on the size/surface area/diagonal of the substrate, the flatness being measured using a SurFlat waviness meter sold by Visuol. It is generally of geometric shape, in particular rectangular, indeed even square, or even circular or oval, etc., and generally exhibits a face which is "upper" (face which is visible) in the position of use, another face which is "lower" (generally hidden, in a framework or carcass) in the position of use, and an edge face (or edge or thickness). The upper face is generally flat and smooth but may also exhibit at least one protruding zone and/or at least one recessed zone and/or at least one opening and/or beveled edges etc., these variations in shape advantageously constituting continuous variations in the sheet (with no change in materials or joins). The lower face is preferably smooth, or indeed provided with bumps (in which case the connectors can be bonded using the adhesive which then also acts as a filler where appropriate, or the sheet comprises another suitable filler such as a resin or a self-leveling film).

The thickness of the glass-ceramic sheet is generally at least 2 mm, in particular at least 2.5 mm, particularly of the order of 3 to 15 mm.

The glass-ceramic may be in a dark color (black, dark brown) or a pale color (white, cream) and may be translucent or opaque or transparent depending on the desired use and the desired look. It is in particular a lithium aluminosilicate glass-ceramic. It may in particular be refined with arsenic (that is to say, have (a parent glass with) a composition comprising of the order of 0.5% to 1.5% by weight of arsenic oxide (expressed as $As_2O_3$)) or may not be refined with arsenic (in particular having a content of arsenic oxides of less than 0.2%, in particular of less than 0.1%, or even zero) or refined with tin or refined with sulfide(s), and may be obtained by rolling or by the float process.

As indicated hereinabove, the sheet may where appropriate comprise various functional and/or decorative coatings, in particular from among those generally used with glass-ceramics, for example coatings based on enamel, on paint, on thin (for example metal, dielectric, etc.) layer(s), etc. For example, one of the faces may comprise one or more enamel layers or one or more enamel patterns having a decorative purpose and/or in order to signal one or more elements (displays, etc.) and/or acting as masking (for example to prevent light sources from being seen directly) and/or for other functions (as light extractor or to render illumination uniform, etc.). The sheet may also be provided with one or more functional layers giving it one or more additional properties, such as scratch resistance, mechanical strength, non-marking, overspill prevention, etc., it being possible in particular for the coating or coatings to be on the visible face or on the opposite face, depending on the type of coating and the desired function.

The sheet may be equipped, particularly and advantageously by the connectors, with various elements (or accessories) allowing various uses so as in particular to form an interactive and modifiable unit or worktop.

For example, it may be equipped with one or more light sources, in particular formed by light-emitting diodes and intended for example to embody (render visible) one or more regions or one or more elements or displays of the sheet, in particular by transmission of light through the sheet. These sources may in particular make it possible to display controls (in the form of keys, logos, or even keypads, etc.) which can for example be activated by contact on the surface of the sheet (using, for example, sensors located under the surface and which may likewise be attached using the connectors) or remotely (in particular by wireless communication), indeed even by simple movement of the hand (by sensors located, if appropriate, on the outside and which record the movement, for example by triangulation, in order to convert it, in particular using a suitable algorithm and a suitable interface, into the activation of a function, for example), or, if appropriate, by placing a predetermined object at a predetermined location on the sheet. The light source(s) may also make it possible to display decorations or various data (to display, for example, computer pages, cooking recipes, etc.) downloaded, for example, by wireless communication using an appropriate interface and projected or transmitted from the light sources onto the surface of the sheet.

The sheet may also be equipped with one or more heating elements, such as induction coils, radiant elements, which also can be actuated in various ways as described for the light sources, and may also be equipped with communications interface(s) with at least one adjacent element (for example light sources or heating elements) and/or if appropriate with at least one external element, for example with an external module for wireless communication, said interface(s) being for example a control unit, a tablet or a touch-screen, a system of the Bluetooth, WLAN, wifi, RFID chip, Lifi, etc. type.

The sheet may also be equipped with other elements, such as one or more waveguides, and with various other components, particularly electrical and/or electronic components, such as a charger (for example for a telephone, induction coil, etc.), one or more leads, an audible or vibrating component (which for example signals that an object of the saucepan type is approaching), etc.

The solution afforded by the present invention is particularly advantageous, as mentioned hereinabove. The small dimensions of the connection element or elements and the possibility of positioning them at various locations, combined with the choice of materials used and the possibility of associating them with removable elements, in order to attach the accessory or accessories to be coupled at a distance that allows them to perform whatever function they might without the risk of damage to said accessories by rubbing or by heat, make it possible to offer a solution to the stated problem that is suitable for all types of glass-ceramic sheet and make it possible to envision fitting and/or removing various types of accessories without the need for complex installations or tooling and without the need to handle the sheets, particularly those of significant dimensions and weight. The product developed according to the invention thus meets the desired objective by proposing a mode of assembly that allows various types of elements to be connected at various points on the sheet, removably where appropriate, without the installation presenting problems of space or of interference with certain accessories combined with the sheet (such as any heating elements there might be, be these radiant or of the induction type), and while at the same time allowing the associated accessories to perform their function in combination with the sheet (such as to illuminate heating regions or to display data using elements added underneath the sheet, etc.), the proposed solution also, where appropriate, allowing the accessories to be exchanged as required or according to the intended purpose of the sheet.

The sheet according to the invention is manufactured in particular from glass-ceramic sheets, particularly of large dimensions, obtained by ceramization, in particular by bonding the connection element(s) to the surface of the glass-ceramics using a thermosetting adhesive as defined according to the invention.

For the record, glass-ceramic sheets are generally manufactured as follows: glass with the composition chosen for forming the glass-ceramic is melted in a melting furnace, the molten glass is then rolled to give a standard ribbon or sheet by passing the molten glass between forming rollers, and the glass ribbon is cut to the desired dimensions. The sheets, which may or may not be already cut, are then ceramized in the way known per se, ceramization consisting in firing the sheets according to the chosen temperature profile in order to convert the glass into the polycrystalline material referred to as "glass-ceramic" the expansion coefficient of which is zero or near zero and which is resistant to thermal shock of as much as 750° C. (or indeed even more). Ceramization generally comprises a step in which the temperature is raised progressively to the nucleation domain, generally situated around the glass transformation domain, a step in which the nucleation temperature range is crossed in a few minutes, a further progressive increase in temperature up to the ceramization hold temperature, holding the ceramization hold temperature for several minutes, followed by rapid cooling down to ambient temperature.

In order to obtain large-sized sheets according to the invention, particularly sheets with a surface area greater than 0.7 m2, the speed of passage during the ceramization cycle is preferentially reduced by at least 25%, preferably by at least 50%, or the length of the ceramization lehr or the residence time in said lehr is increased by at least 25%, preferably by at least 50% with respect to the speed, length or residence time respectively that are optimal or common practice for obtaining a ceramic-glass substrate that has a surface area smaller than 0.4 m$^2$.

If appropriate, the process also comprises a cutting operation (generally before ceramization), for example with a water jet, mechanical scoring with a cutting wheel, etc., followed by a shaping operation (grinding, beveling, etc.). The process can also comprise a step of rolling or sag bending in order to form specific protrusions.

Other advantageous features and details of the invention will emerge below from the description of nonlimiting embodiments of the invention, with reference to the appended drawings, in which:

FIG. 4b depicts an alternative form of the embodiment of FIG. 4a.

The same references are used throughout the figures to denote the same types of element.

In each of the aforementioned figures, the sheet (1) according to the invention is a monolithic sheet of glass-ceramic (for example a sheet of the kind marketed by the Eurokera company under the reference KeraBlack+), this sheet having an upper face and a lower face which are smooth, and having for example a thickness of 6 mm and a surface area of 0.78 m$^2$, and being in particular obtained by a procedure like that of patent WO 2012156444, reducing the speed of passage through the ceramization lehr by 50% in order to obtain said large-sized sheet without any flatness defects.

In each embodiment illustrated, the glass-ceramic sheets (1), in particular intended to act as the surfaces of units or as large worktops, are equipped, on their lower face (1'), with several connection elements (2, 2') each one comprising at least one shell or cylindrical body (3), which in particular is hollow or semi-hollow, each connection element being bonded under the underside (or the face that is lowermost in the position of use) of the sheet by means of a thermosetting adhesive (4) (not visible/not depicted in FIGS. 2a and 2b but present at the base of the connectors between the connectors and the sheet) that has a coefficient of expansion of less than 900×10$^{-7}$ K$^{-1}$ between −40 et 80° C. and a shear strength greater than 10 N/mm$^2$, such as an epoxy-type adhesive marketed by the Henkel company under the reference Loctite EA 9492, or a cyanoacrylate-type adhesive marketed by the Henkel company under the reference Loctite 480.

Figure 1A:
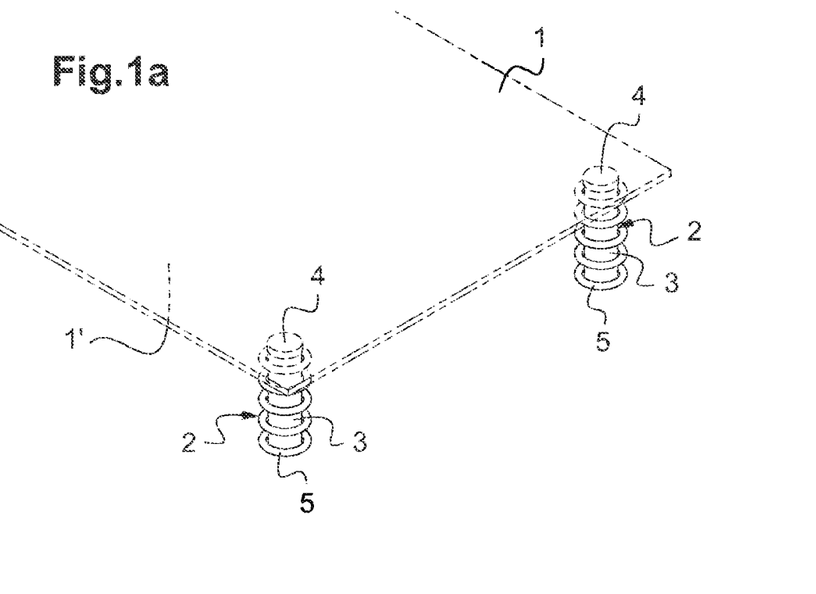
FIG. 1a depicts a schematic view in perspective (viewed from above) of a sheet according to the invention according to a first exemplary embodiment.
Figure 1B:
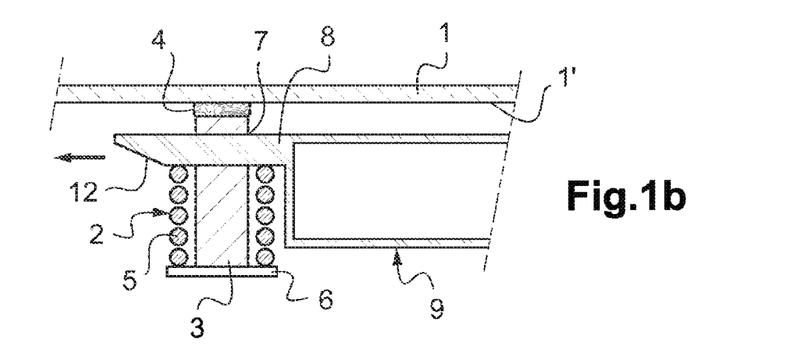
FIG. 1b depicts a schematic cross section of said sheet along the axis of one of the connection elements depicted in FIG. 1a when a support element that is to accept one or more pieces of equipment or accessories that are to be associated is added and fixed to the sheet using the connection element.
Figure 1C:
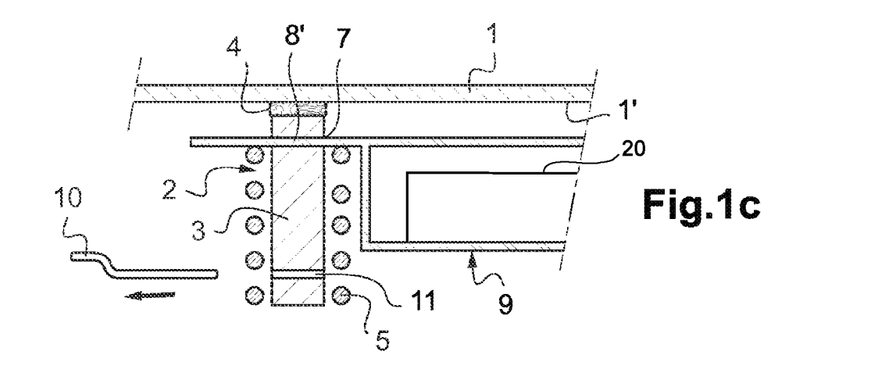
FIG. 1c depicts a schematic cross section of an alternative form of FIG. 1b, this time when a support element previously fixed using a connection element is being removed.

In the first embodiment illustrated in FIGS. 1a to 1c, the sheet is equipped with several identical or similar connection elements (2) (two of these are depicted in FIG. 1a, it being possible for these elements to be situated at any point under the sheet, it being possible for the outlines of the sheet to extend beyond those depicted schematically in FIG. 1a), each one formed of at least a cylindrical body (3) with a diameter of 10 mm and a height of 4 cm, for example made from a non-magnetic material such as aluminum, and at least one spring (5), for example made of stainless steel, having, for example, a free length of 34 mm and a maximum force of 48 N, fixed to said cylindrical body (for example fixed on the outside or the inside of the cylindrical body or on a base (6) likewise fixed, permanently or removably, on the cylindrical body). The cylindrical body has a transverse opening (7), for example through-opening, approximately 3 mm from the lower face of the sheet, so that a part (8, 8') of a support element (9), of suitable dimensions for being able to be housed in this opening, can be inserted therein.

The support element (9) takes, for example, the form of a rectangular aluminum or plastic casing measuring 19×26 cm and with a (side wall) thickness of 12 mm, and is intended to accept one or more pieces of equipment or accessories (20) such as induction coils, an electronic unit, etc. The part (8, 8') of said support element constitutes a complementary fixing means of the fixing system provided in each connection element, said fixing system being for example formed by the combination of the spring (5) and of the opening (7) in the embodiment of FIG. 1b (it also being possible for the base to form part of this fixing system), or being formed by the combination of the spring (5), of the opening (7), of a pin (10) and of a transverse second through-opening (11) toward the lower end of the connection element in the embodiment of FIG. 1c.

Thus, in the embodiment of FIG. 1b, when the support element bearing the equipment or accessories is being fitted, the particular shape of the end (12) of this part (8) (or fixing means (8)) of the support element (9) allows it to be introduced (in the direction of the arrow) into the opening (7) of the connector (2) while at the same time progressively compressing the spring (5) as far as a position in which the spring immobilizes said part by exerting a force on said part, perpendicular to the direction of insertion and in the direction of the sheet. If the equipment needs to be removed or changed, the support element can be removed by pulling in the opposite direction to the direction of insertion, thus releasing the spring and the support element.

In the alternative form illustrated in FIG. 1c, which also depicts one mode of removable fixing, when the support element bearing the equipment or accessories is being fitted, the part (8') (or fixing means (8')) of the support element (9) is introduced into the opening (7) of the connector (2), and then a pin (10) is introduced into the opening (11) at the bottom of the connector, compressing the spring (5) so that the spring immobilizes the part (8') of the support element while exerting a force on said part, perpendicular to the direction of insertion of this part and in the direction of the sheet. If the equipment needs to be removed or changed, the support element can be removed by pulling on the pin (in the direction indicated by the arrow), thus releasing the spring and the support element which can be removed.

If appropriate, the base (6) in FIG. 1b may also act as a removable pin and form part of the fixing system of the connector.

Figure 2A:
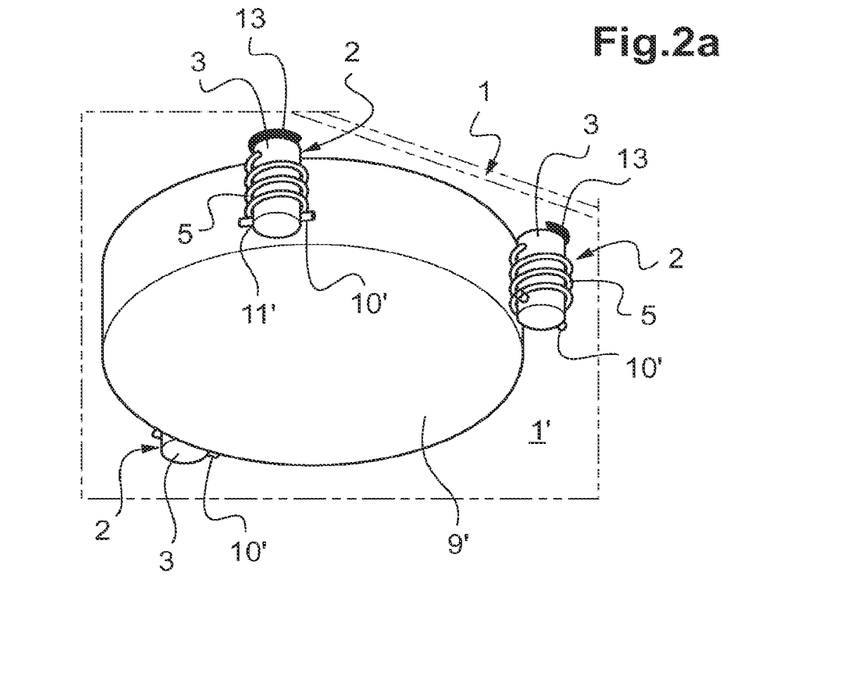
FIG. 2a depicts a schematic view (from beneath) of an alternative form of the previous embodiment, with a support element (receiving one or more pieces of equipment or accessories, not depicted, that are to be associated) fixed to several connectors.
Figure 2B:
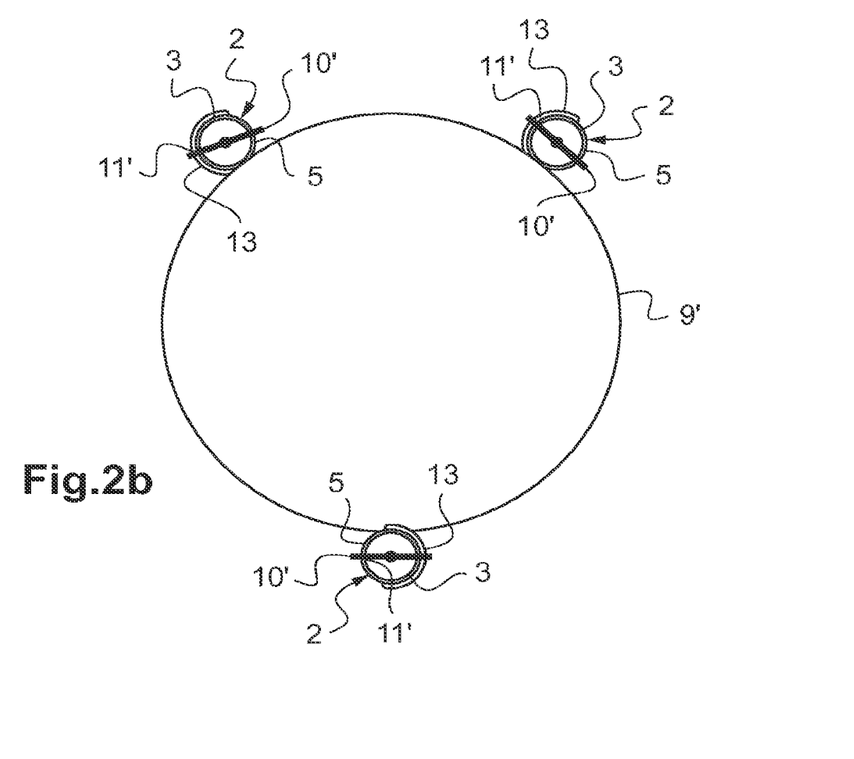
FIG. 2b depicts a view from beneath of the connection elements depicted in FIG. 2a with the support element fixed to said elements.

In the embodiment or alternative form illustrated in FIGS. 2a and 2b, the sheet is equipped with identical or similar connection elements (2) which are associated in groups of three, each being formed as in the previous embodiment of a cylindrical body (3) and of a spring (5) (for example made from the same material and having the same dimensions as before) fixed to said cylindrical body.

The support element (9') for example takes the form of a round casing 21.5 cm in diameter, made of polycarbonate, and is intended to accept one or more pieces of equipment or accessories such as induction coils, an electronic unit, etc. This casing is provided with three external hooks (13) constituting fixing means that complement the fixing systems provided in the connection elements, each of said fixing systems being formed for example of the combination of the spring (5), of a pin (10') and of a transverse through-opening (11') toward the lower end of the connection element.

Thus, when the support element (9') bearing the equipment or accessories is being fitted, said support element is brought in from underneath between the connectors (2), with the hooks positioned between the connectors, then the support element is pivoted so that each hook simultaneously fits around one of the connectors. A pin (10') is then introduced into each of the connectors into the opening (11') provided at the bottom of each of the connectors, compressing the associated spring (5) so that the spring locks the relevant hook by exerting on said hook a force in the direction of the sheet thus immobilizing the support element in its position. If the equipment needs to be removed or changed, the support element can be removed by pulling on the pins, thus releasing the springs and by performing the reverse (rotational and translational) movements.

Figure 3A:
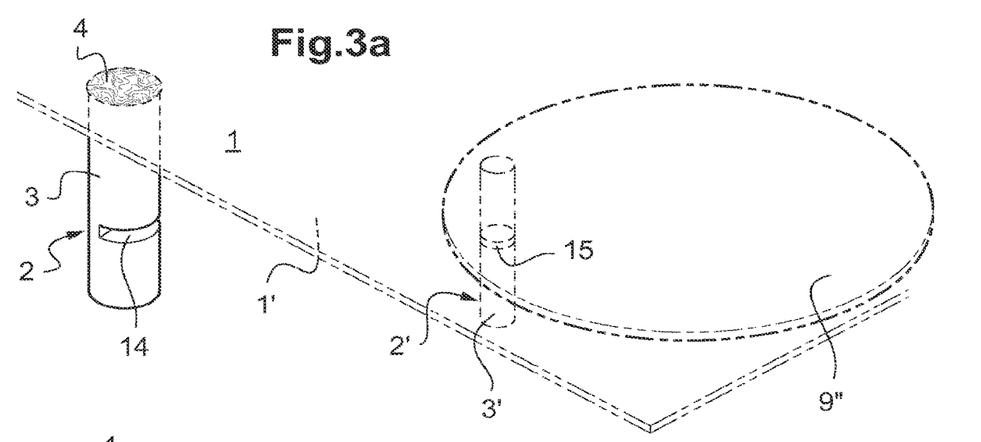
FIG. 3a depicts a schematic perspective view (view from above) of the sheet according to a third exemplary embodiment of the invention, when a support element accepting one or more pieces of equipment or accessories (not depicted) to be associated (this support element where appropriate forming part of the sheet or of the connector on which it is mounted) is in a position for operational fitting of the equipment or accessories.
Figure 3B:
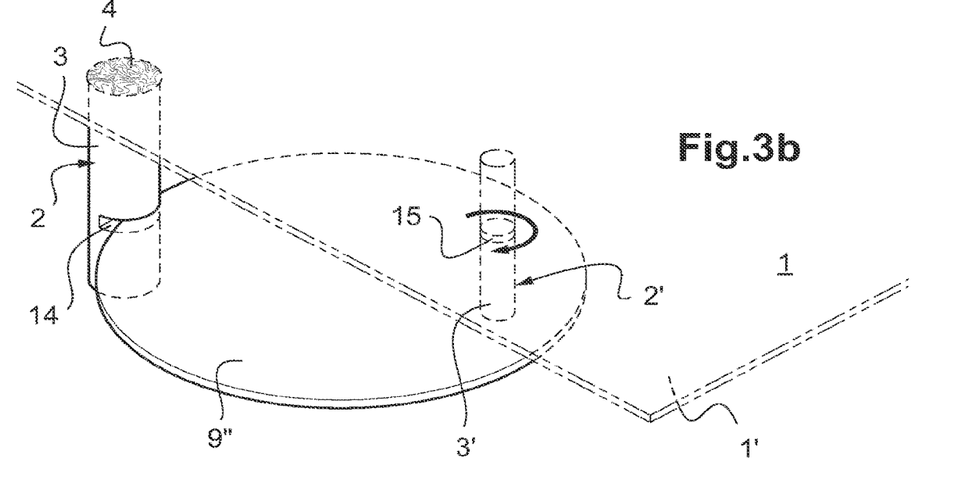
FIG. 3b depicts a schematic view as in FIG. 3a, this time with the support element in a position for possible removal of the equipment or accessories.

In the embodiment illustrated in FIGS. 3a and 3b, which likewise depict a mode of fixing that is (at least in part) removable, the sheet is equipped with two types of connection element, associated in pairs, a first type of element (2), which elements are fixed (and distributed) at the periphery, each one formed of a cylindrical body (3) (for example made from the same material and with the same dimensions as before) and each comprising a slot or cavity (14), and a second type of element (2'), each element fixed some distance away from the first type of element with which it is associated, and each one formed of a cylindrical body (3') (for example made from the same material and with the same dimensions as before) and comprising a rotary part (15) or a rotary or pivoting pin or of the sliding pivot type. The support element (9") for example takes the form of a round plate 60 mm in diameter and 1.2 mm thick made of stainless steel, and is intended to accept one or more pieces of equipment or accessories such as induction coils, an electronic unit, etc. This plate is fixed (permanently, thus forming part of the sheet and/or of the connection element, or alternatively removably) on the rotary part or the pin of the second type of element (2') and is able to fit or plug or clip at its periphery into the slot (14) of the first type of element when it is made to pivot or turn about the axis of rotation or the axis of pivoting of the element (2'). When the plate is pushed in (FIG. 3a) the equipment items and/or accessories are able to operate in combination with the sheet, and when the plate is turned (in the direction of the arrow) and extracted from the sheet, the equipment items and/or accessories may be accessible and repaired or changed. The slot (14) at the periphery of the plate (at least the part that becomes housed in the slot) for example have complementing shapes (this periphery of the plate forming the fixing means complementary to the fixing system formed at least by the slot) and/or the coupling of these two parts may be achieved using other means, for example by providing a magnet inside the slot, the associated part at the periphery of the plate then being ferromagnetic. Means of immobilizing the plate may also be provided when this plate is in the immobilized position.

Figure 4A:
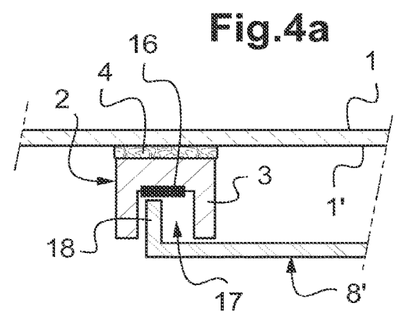
FIG. 4a depicts a schematic cross section of a fourth exemplary embodiment of a sheet according to the invention.
Figure 4B:
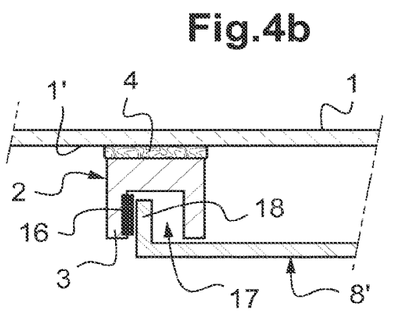

In the fourth embodiment illustrated in FIGS. 4a and 4b which likewise depict one mode of removable fixing, the sheet (1) is equipped with several identical or similar connection elements (2), each one formed of at least one cylindrical body (3), hollow at its base, 2 mm in diameter and 10 mm in height, for example made of a non-magnetic material such as aluminum, and of at least one magnet (16) fixed (for example by adhesive bonding or insetting) in the cavity (17) at the base of the connector (2).

The support element intended to accept one or more pieces of equipment or accessories takes for example the form of a casing or housing made of aluminum or of plastic and has a part (8') with an end (18) able to become housed in the cavity (17) of the connector, this end being formed for example of, or coated with, a ferromagnetic material and forming a fixing means complementing the fixing system provided in each connection element, said fixing system being formed for example by the combination of the cavity and of the magnet.

In the embodiment of FIG. 4b, when the support element bearing the equipment items or accessories is being fitted, the end (18) of the support element is introduced into the cavity (17) at the connector (2) where it is attracted by the magnet with a force exerted in the direction of the plate. If equipment needs removing or changing, the support element can be removed by exerting a force in the opposite direction. In the alternative form in FIG. 4b, the magnet is this time positioned in such a way that the force exerted between the magnet and the end (17) is perpendicular to the direction of insertion.

The sheet according to the invention may in particular be used to advantage to produce a new range of cooking devices or (furniture) units.

The invention claimed is:

1. A glass-ceramic sheet to be used as a surface of a furniture unit and/or as a worktop, comprising:
   in at least one of its faces, at least one connection element having a height less than 10 cm and a cross section having a diameter less than 3 cm,
   wherein said at least one connection element is made from a material configured to withstand at least 70° C. and is bonded to said face by a thermosetting adhesive,
   wherein the at least one connection element includes a fixing system for removably fixing an element to be added, the element to be added including at least one fixing means that compliments the fixing system of the connection element.

2. The glass ceramic sheet as claimed in claim 1, wherein said adhesive has an expansion coefficient less than 900× $10^{-7}$ $K^{-1}$ between −40 and 80° C., and a shear strength greater than or equal to 10 N/mm².

3. The glass-ceramic sheet as claimed in claim 1, wherein said at least one connection element has a height less than 6 cm, and a cross section less than 2 cm.

4. The glass-ceramic sheet as claimed in claim 1, wherein said at least one connection element is made in one or more parts and has an external appearance of a cylindrical stud or pin, and
   wherein the at least one connection element includes at least one of one or more hollowed parts and one or more other external or internal constituent components.

5. The glass-ceramic sheet as claimed in claim 1, wherein said at least one connection element is formed, at least in part, of at least one of refractory and non-magnetic material(s).

6. The glass-ceramic sheet as claimed in claim 1, wherein the sheet includes several connection elements positioned under a lower face of the sheet.

7. The glass-ceramic sheet as claimed in claim 1, wherein at least part of the support element is configured to secure at least part of one or more accessories.

8. The glass-ceramic sheet as claimed in claim 1,
wherein the one or more support elements are of a casing or plate type and are configured to accept one or more accessories,
wherein the one or more accessories include heating element(s), display system(s), electronic board(s), light source(s), control unit(s) or interface(s), and sensor(s).

9. The glass-ceramic sheet as claimed in claim 1,
further comprising an immobilizing means provided on one or more of the at least one connection elements to immobilize the projection part of the support element that is to be added once this support element is in position in the at least one connection element,
wherein the immobilizing means exerts a force in a direction of the glass ceramic sheet, a direction of insertion of the projection part of the element that is to be added into the at least one connection element being different from, a direction of said force exerted by the immobilizing means.

10. The glass-ceramic sheet as claimed in claim 9,
wherein the immobilizing means is formed by the combination of a pressing element, with a stop element keeping the spring in compression once the projection part of the added element has been introduced into the at least one connection element.

11. The glass-ceramic sheet as claimed in claim 9,
wherein the immobilizing means is a magnet.

12. The glass-ceramic sheet as claimed in claim 1,
wherein said sheet is a monolithic sheet having a thickness of less than 15 mm, an expansion coefficient of less than $30 \times 10^{-7}$ $K^{-1}$ between 20° C. and 400° C., and a surface area of greater than or equal to 0.7 $m^2$.

13. An item of furniture and/or household equipment, comprising at least one glass-ceramic sheet as claimed in claim 1.

14. The item of furniture and/or household equipment as claimed in claim 13, wherein said sheet occupies at least 50% of one face of said item of furniture and/or household equipment, and is mounted on one or more support elements to provide a continuous stable surface.

15. The item of furniture and/or household equipment as claimed in claim 13, wherein said sheet is equipped with accessories or equipment of one or more of heating element(s), light source(s), audible or vibrating component(s), display system(s), electronic board(s), control unit(s) or interface(s), and sensor(s).

* * * * *